J. F. MASSEY.
RESILIENT WHEEL.
APPLICATION FILED SEPT. 8, 1920.
1,432,253. Patented Oct. 17, 1922.
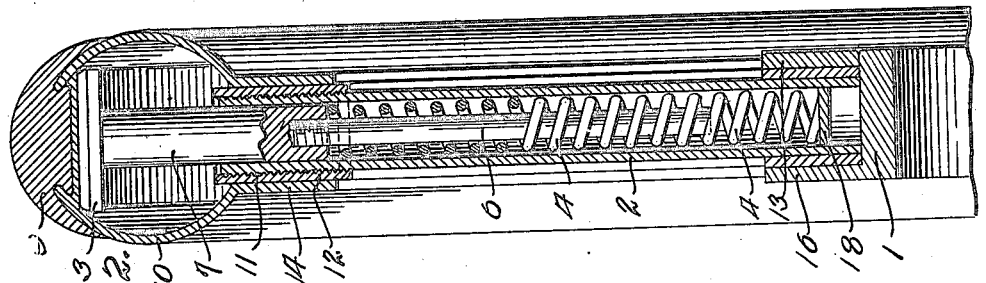
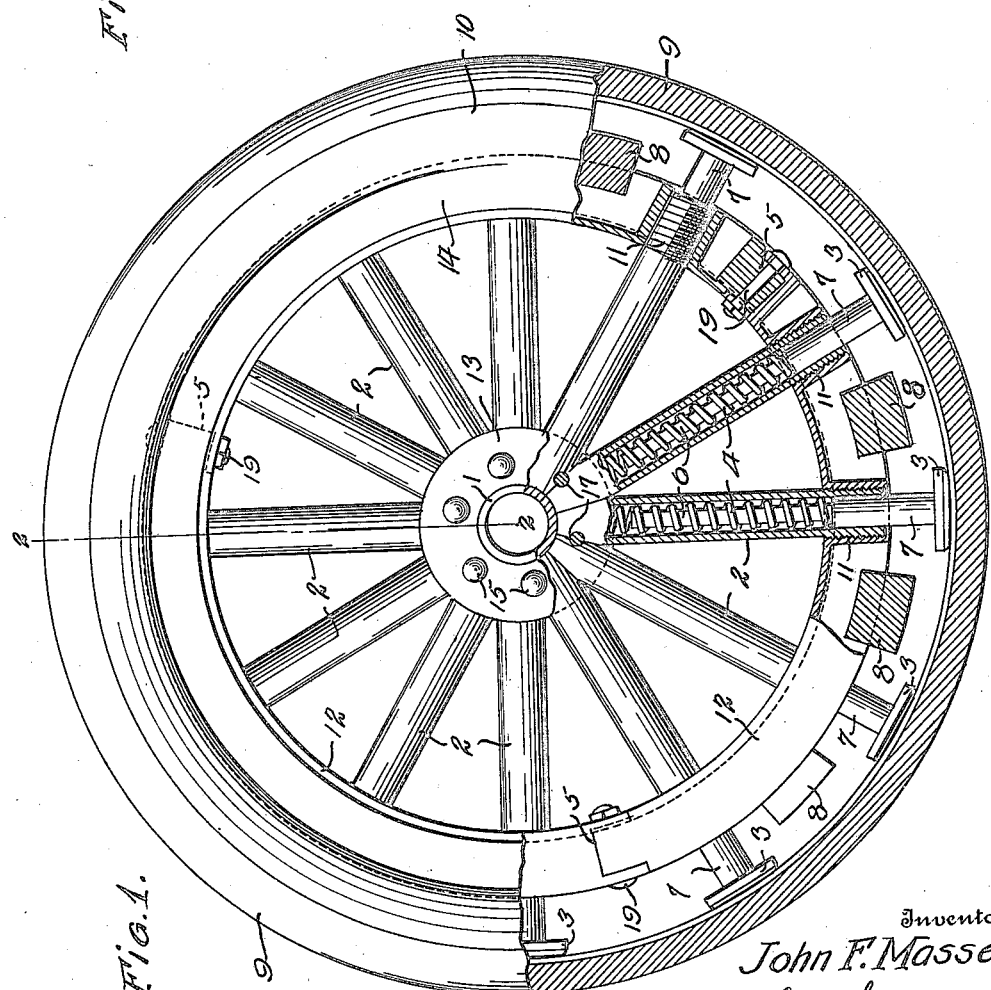
Inventor
John F. Massey Patented Oct. 17, 1922.

1,432,253

UNITED STATES PATENT OFFICE.

JOHN FREDERICK MASSEY, OF CHICAGO, ILLINOIS.

RESILIENT WHEEL.

Application filed September 8, 1920. Serial No. 408,833.

*To all whom it may concern:*

Be it known that I, JOHN FREDERICK MASSEY, a citizen of the United States, residing at Chicago, in the county of Cook and State of Illinois, have invented a new and useful Resilient Wheel, of which the following is a specification.

The object of my invention is to provide an improved resilient wheel having novel spring spokes, and having a novel inner tire carrying rubber bumpers; to construct such inner tire in sections; and to provide an outer tire which is not made in sections; to provide novel means for assembling the wheel; and to eliminate the usual inner pneumatic tube. I attain these and other objects of my invention by the mechanism illustrated in the accompanying drawings, in which—

Fig. 1 is a side elevation of the invention, partly in section; and

Fig. 2 is a transverse section on line 2—2 of Fig. 1, partly in elevation.

Like numerals designate like parts in each of the several views.

Referring to the accompanying drawings, I provide a hub member 1 to which are attached hollow spokes 2 by means of plate or washer 13 and bolts 15, as shown in Fig. 1. I provide suitable plungers 7 each carrying a suitable padded plunger head 3 frictionally bearing on the inner surface of the outer rim 10 which carries a heavy rubber tread 9 of the shape shown in Fig. 2. The metal rim 10 is provided with annular flanges 14 within which is slidably mounted the inner metal tire 12 which is constructed in a plurality of sections, preferably three as shown, and having joints 5 which are secured together by bolts 19. Suitably attached to the inner tire 12 are spaced rubber bumpers 8, as shown in Fig. 1. Hollow spokes 2 contain suitable spiral springs 4 which encircle the rods 6 and bear against the ends of plungers 7 of which these rods are an extension, to give a considerable degree of resilient action to the wheel. Hollow spokes 2 are provided with threaded ends 11 which secure them to the inner tire 12. Hub 1 has an integral annular flange 16, as shown in Fig. 2.

In assembling the device, the spokes are screwed into the sections of the inner tire 12 and the springs and plungers are inserted in the spokes, and assembled within the outer rim 10, section by section, and then bolted together. The plate 13 is finally applied and secured by the bolts 15. The inner tire is slidable or rotatable relative to the outer tire within the flanges 14 of which it is mounted. The inner ends of the spiral springs 4 bear against the plates 18 at the inner end of the hollow spokes 2, and the outer ends of the spiral springs bear against the inner ends of the plungers 7 to cause the padded ends of the plungers to resiliently bear against the inner surface of the outer rim 10. The rubber bumpers 8 under stress of travel will be brought into frictional contact with the metal rim 10 when the latter is thrown into off-set position relative to the inner wheel 12 and hub 1 on which the weight of the vehicle immediately rests. In other words the rubber bumpers take up any shock not absorbed by springs 4. The inside wheel 12 being loosely mounted can stop or move in any direction in the outer metal rim 10 subject to the resilient action of the springs and the limitation of space between the rubber bumpers and the inner surface of the rim 10. The length of the plungers and springs may be changed if desired to obtain a greater or less degree of resiliency in the wheel.

It is within the contemplation of my invention to suitably modify the size and position of the elements illustrated as may be found expedient to improve the operation of the wheel.

What I claim is:

1. In a resilient wheel, the combination of an outer metal rim of hollow construction having a solid rubber tread, an inner wheel resiliently mounted in the outer metal rim, said inner wheel being constructed in detachable sections, hollow metal spokes detachably secured to said wheel the spokes having plates on their inner ends, a hub member on which the other ends of the spokes are detachably mounted, plunger members slidably mounted within the hollow spokes, relatively long springs extending substantially the entire length of the spokes and having one of their ends bearing against the plunger members and having the other end bearing against plates at the inner ends of the hollow metal spokes in each instance to give a larger degree of resilient action to the plungers, and padded heads on the plungers, said heads being of relatively small area, whereby the padded heads frictionally engage the inner surface of the outer metal rim.

2. In a resilient wheel, the combination of an outer metal rim of hollow construction, an inner wheel loosely mounted in the outer metal rim, said inner wheel being constructed in detachable sections, hollow metal spokes secured to said wheel, a hub member to which the other ends of the spokes are affixed, plunger members slidably mounted within the hollow spokes, relatively long springs extending substantially the entire length of the spokes and having one of their ends bearing against the plunger members and having the other end of said springs extending to the inner ends of the hollow metal spokes to give a large degree of resilient action, and padded heads on the plungers.

JOHN FREDERICK MASSEY.